United States Patent [19]

Spasuik

[11] 3,841,504

[45] Oct. 15, 1974

[54] BALE LOADER

[76] Inventor: Paul Spasuik, Box 146, Unity, Saskatchewan, Canada

[22] Filed: June 2, 1972

[21] Appl. No.: 259,306

[30] Foreign Application Priority Data
Feb. 1, 1972   Canada .................................. 133657

[52] U.S. Cl. .................................. 214/78, 280/462
[51] Int. Cl. ............................................. B60p 1/48
[58] Field of Search ........ 214/78, 79, 80, 77 R, 6 B; 198/7 BL; 280/462

[56] References Cited
UNITED STATES PATENTS

| | | | |
|---|---|---|---|
| 1,381,585 | 6/1921 | Nelson | 214/78 |
| 2,405,755 | 8/1946 | Rodefeld | 214/78 |
| 2,491,079 | 12/1949 | Bestland | 214/78 X |
| 2,605,915 | 8/1952 | Day | 198/7 BL |
| 2,696,924 | 12/1954 | Madsen | 214/80 |
| 2,738,633 | 3/1956 | Bestland | 214/78 X |
| 2,792,136 | 5/1957 | Abbott | 214/78 |
| 2,804,219 | 8/1957 | Hewson et al. | 214/80 |
| 3,539,067 | 11/1970 | Secrist et al. | 198/7 BL |
| 3,550,746 | 12/1970 | Juul et al. | 198/7 BL |

*Primary Examiner*—Robert G. Sheridan
*Assistant Examiner*—Donald W. Underwood
*Attorney, Agent, or Firm*—Cushman, Darby & Cushman

[57] ABSTRACT

A bale loader has a wheeled body having an upper surface formed as a platform, the body being attachable to a tractor hitch. A bale lift is pivotally connected to a front end of the body adjacent one side thereof for pivotal movement about a horizontal lateral axis. The bale lift is pivotable about the lateral axis between a first position in which the bale lift engages the underside of bales on the ground during forward movement of the loader so as to support the bales, and a second position in which the bales fall rearwardly from the lift onto the platform.

1 Claim, 3 Drawing Figures

BALE LOADER

This invention relates to bale loaders, that is to say vehicles which pick up bales of hay or similar crops from the ground for transportation.

It is an object of the invention to provide a relatively simple bale loader which can be towed behind a tractor.

According to the invention, the bale loader has a wheeled body having an upper surface formed as a platform, the body having means for attaching a tractor hitch thereto, a bale lift pivotally connected to a front end of the body adjacent the side thereof for pivotal movement about a horizontal lateral axis, and means for pivoting the bale lift about the lateral axis between a first position in which the bale lift engages the underside of bales on the ground during forward movement of the loader so as to then carry the bales on the bale lift and a second position in which the bales fall rearwardly from the lift onto the platform.

Advantageously, the bale lift has a series of forwardly extending prongs which engage the underside of the bales, and the pivoting means includes a hydraulic cylinder connected between the body and the bale lift.

One embodiment of the invention will now be described, by way of example, with reference to the accompanying drawings, in which.

Figure 1:
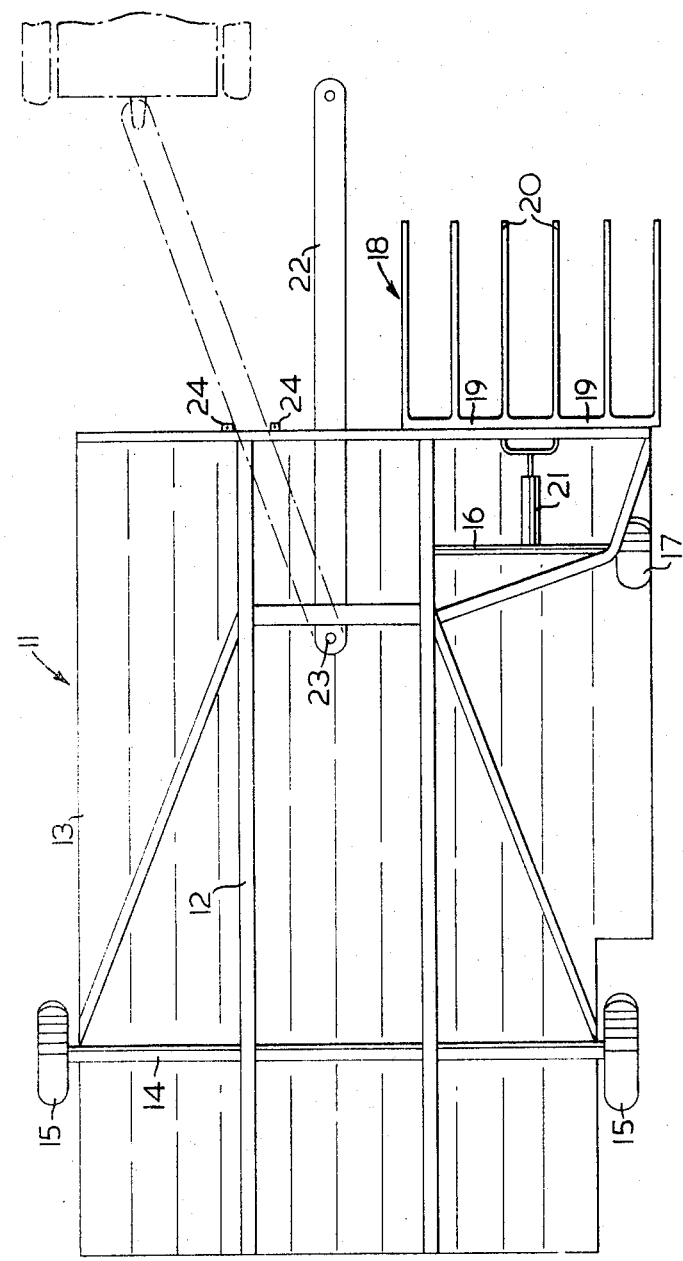
FIG. 1 is a plan view of a bale loader.

Referring to the drawings, a bale loader has a wheeled body 11 including an angle iron framework 12 to the top of which is secured a platform 13. A rear axle 14 is secured to the framework 12 adjacent the rear end thereof, and carries rear wheels 15. A front axle 16 is secured to the framework 12 near the front end on one side of the framework 12 and carries a front wheel 17 at the laterally outward end thereof.

A bale lift 18 is pivotally connected to the front end of the platform 13, on the same side as the front axle 16, by hinges 19 which enable the bale lift 18 to pivot about a horizontal lateral axis. The bale lift 18 has a series of forwardly extending prongs 20. A hydraulic cylinder 21 is pivotally connected between the bale lift 18 and the front axle 16.

In field use, the bale loader is hitched to a tractor by hitch 22 pivotally secured to the framework 12 by a bolt 23. The hitch 22 is maintained in an inclined position, as indicated in dashed lines in FIG. 1, by pins 24 removably located in the body 11, so that the tractor (also indicated in dashed lines) is positioned to one side of the bale lift 18.

Figure 2:
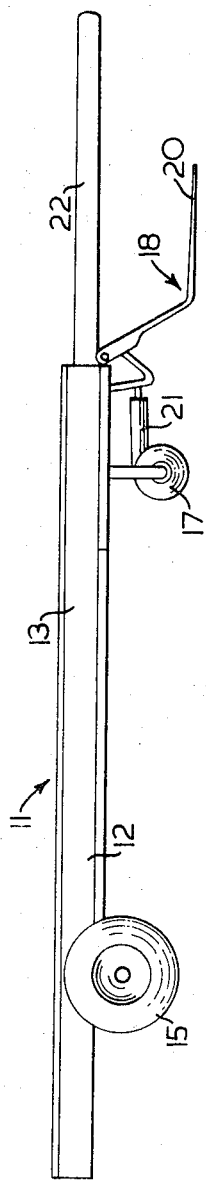
FIG. 2 is a side view of a bale loader with the bale lift in the lower position.
Figure 3:
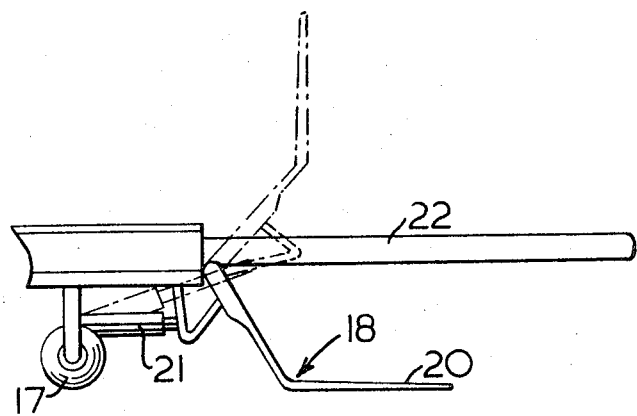
FIG. 3 is a similar view showing the bale lift in the upper position.

The hydraulic cylinder 21 is connected to a hydraulic pump and control on the tractor. The bale loader is towed forwardly by the tractor with the bale lift 18 in the down position, as shown in FIG. 2, with the prongs 20 very close to the ground. The tractor is steered so that the prongs 20 pass beneath the bales and subsequently support them and carry them along. The hydraulic cylinder 21 is then actuated to pivot the bale lift 18 outwardly to the position shown in FIG. 3, so that the bales fall rearwardly from the bale lift onto the platform 13. The bales can then be moved manually to a convenient position on the platform 13. The lift 18 is then lowered back to the down position shown in FIG. 2 to pick up further bales.

For load hauling, the pins 24 are removed so that the hitch 22 assumes the position shown in full lines.

It will thus be seen that a simple, yet effective and efficient bale loader is provided by the invention.

I claim:

1. A bale loader comprising
a rigid platform structure of generally rectangular configuration,
wheel means supporting said platform structure for ground movement in a generally horizontally extending parallel relation to the ground,
an elongated hitch bar extending forwardly of the forward end of said platform structure and having a forward end provided with means for effecting a detachable articulated draft connection with a tractor about a first vertical axis generally fixed with respect to the tractor at a rearward central location with respect thereto,
means pivotally connecting the rearward end of said hitch bar adjacent the forward end portion of said platform structure centrally of the width thereof for swinging movement about a second vertical axis fixed with respect to said platform structure between a transport position wherein said hitch bar extends longitudinally of said platform structure with said first and second pivotal axes substantially longitudinally aligned so that said platform structure is in general longitudinal alignment with a pulling tractor when pulled forward thereby and a bale lifting position wherein said hitch bar extends angularly of said platform structure with said first axis offset laterally with respect to said second axis,
releasable stop means carried by the forward end of said platform structure and engaged with said hitch bar intermediate the ends thereof for releasably retaining said hitch bar in said bale lifting position so that approximately one-half of said platform structure is disposed laterally outwardly of a pulling tractor when said platform structure is pulled thereby with said hitch bar in said bale lifting position,
a generally rigid bale lifting structure having a width less than half the width of said platform structure disposed within the aforesaid laterally outwardly disposed one-half thereof,
means for pivotally connecting said bale lifting structure to the forward end of said platform structure for pivotal movement about a laterally extending horizontal axis fixed with respect to said platform structure between a first position wherein the bale lifting structure extends downwardly and forwardly from the forward end of said platform structure to engage the undersides of a bale on the ground during forward movement of the platform structure by a pulling tractor with said hitch bar in said bale lifting position and a second position wherein said bale lifting structure extends upwardly and forwardly of the forward end of said platform structure so that a bale engaged thereby as aforesaid falls rearwardly therefrom onto the rearwardly adjacent area of the platform, and
means connected between said platform structure and said bale lifting structure for effecting movement of the latter between said first and second positions.

* * * * *